United States Patent
Tseng

(10) Patent No.: US 9,091,293 B1
(45) Date of Patent: Jul. 28, 2015

(54) ROTARY FASTENER

(71) Applicant: HANWIT PRECISION INDUSTRIES LTD., New Taipei (TW)

(72) Inventor: Ying-Chih Tseng, New Taipei (TW)

(73) Assignee: HANWIT PRECISION INDUSTRIES LTD., New Taipei (TW)

( * ) Notice: Subject to any disclaimer, the term of this patent is extended or adjusted under 35 U.S.C. 154(b) by 0 days.

(21) Appl. No.: 14/256,780

(22) Filed: Apr. 18, 2014

(51) Int. Cl.
*F16B 21/12* (2006.01)
*F16B 39/24* (2006.01)
*F16B 7/10* (2006.01)

(52) U.S. Cl.
CPC ............... *F16B 39/24* (2013.01); *F16B 21/12* (2013.01); *F16B 7/105* (2013.01)

(58) Field of Classification Search
CPC ......... F16B 21/12; F16B 21/125; F16B 7/105
USPC ................... 411/351, 356, 353, 347, 349; 403/109.3, 109.6, 324
See application file for complete search history.

(56) References Cited

U.S. PATENT DOCUMENTS

| | | | | |
|---|---|---|---|---|
| 701,238 A * | 5/1902 | Williams | ................ | 292/61 |
| 2,635,317 A * | 4/1953 | Harley | ................ | 24/639 |
| 4,113,221 A * | 9/1978 | Wehner | ................ | 248/408 |
| 5,433,552 A * | 7/1995 | Thyu | ................ | 403/378 |
| 6,746,058 B2 * | 6/2004 | Kienzler | ................ | 292/175 |
| 6,868,590 B2 * | 3/2005 | Bentrim | ................ | 24/458 |
| 7,980,519 B2 * | 7/2011 | Chen | ................ | 248/125.8 |
| 2007/0003361 A1 * | 1/2007 | Wang | ................ | 403/109.3 |
| 2011/0176862 A1 * | 7/2011 | Wang | ................ | 403/243 |
| 2014/0099155 A1 * | 4/2014 | Chen | ................ | 403/83 |

* cited by examiner

*Primary Examiner* — Fleming Saether
(74) *Attorney, Agent, or Firm* — Muncy, Geissler, Olds & Lowe, P.C.

(57) ABSTRACT

A rotary fastener includes a mounting base member, a fastening device including a pin member suspending in the mounting base member and a head member fastened to the pin member and disposed outside the mounting base member, and an operating device including a bottom seat member fastened to the mounting base member, an operating cap member fastened to the head member and rotatable relative to the bottom seat member to move the fastening device between a locking position where the pin member is extended out of the bottom side of the mounting base member and an unlocking position where the pin member is received inside the mounting base member, and a guide track for guiding the operating cap member and the fastening device to move axially relative to the bottom seat member and the mounting base member upon rotation of the operating cap member by an external force.

10 Claims, 12 Drawing Sheets

ROTARY FASTENER

BACKGROUND OF THE INVENTION

1. Field of the Invention

The present invention relates to fastener means for detachably securing two panel members together and more particularly, to a rotary fastener, which comprises a mounting base member, a fastening device and an operating device rotatable to move the fastening device in and out of the mounting base member between a locking position to lock the two panel members together and an unlocking position for allowing separation of the two panel members.

2. Description of the Related Art

Screws and pins are widely used in drawers, machines and many other retractable devices for temporarily locking a movable member to a fixed member in a predetermined operating position. Further, in a desk computer, notebook computer, industrial computer or workstation that consists of multiple devices or mechanisms, screws or pins may be used to detachably lock one first panel member to a second panel member. Unlocking these screws or pins allow separation of the first panel member and the second panel member.

However, mounting or dismounting the screws or pins, the users hand may easily be injured by the points or threads of the screws or pins. Further, the screws or pins can get lost easily after dismounting. If some screws or pins get lost, the assembled structure may be unstable. Further, a proper hand tool must be used when mounting or dismounting the screws or pins. If a proper hand tool is not available, the mounting or dismounting work will be interrupted, causing inconvenience.

In order to eliminate the aforesaid problems, rotary fasteners are created. FIGS. 11 and 12 illustrate a rotary fastener for use to lock panel members together. As illustrated, this design of rotary fastener comprises a mounting base member A, which comprises an axial through hole A0 extended from opposing top and bottom sides thereof and a recessed accommodation chamber A1 located in the top side, and a locking device B inserted through the axial through hole A0 of the mounting base member A. The locking device B comprises a locking pin B1, a compression spring B2, a position-limit member B3, and an operating knob B4. The locking pin B1 comprises a pin body B13, a bottom locking block B11 located at a bottom end of the pin body B13, a stop flange B12 extending around the periphery of the pin body B13 adjacent to the bottom locking block B11, a locating groove B15 extending around the periphery of the pin body B13 and spaced above the stop flange B12, two cut planes B14 bilaterally located on the periphery of the pin body B13, and a screw hole B16 located in an opposing top end of the pin body B13 remote from the bottom locking block B11. The compression spring B2 is sleeved onto the locking pin B1 and stopped between the stop flange B12 and the position-limit member B3. The position-limit member B3 is fixedly mounted in the recessed accommodation chamber A1 of the mounting base member A, comprising an oblong position-limit hole B30 cut through opposing top and bottom sides thereof and two cut planes B31 located in the oblong position-limit hole B30 and respectively abutted against the cut planes B14. The operating knob B4 is disposed above the mounting base member A, comprising a bottom screw rod B41 threaded into the screw hole B16 of the locking pin B1. The user can pull the operating knob B4 to lift the locking pin B1 and to compress the compression spring B2, enabling the bottom locking block B11 to be received in the axial through hole A0 inside the mounting base member A. When the locking pin B1 reaches the position where the locating groove B15 is kept in horizontal alignment with the position-limit member B3, the user can rotate the operating knob B4 and the locking pin B1 to move the two cut planes B14 of the locking pin B1 away from the two cut planes B31 of the position-limit member B3, enabling the pin body B13 of the locking pin B1 to be temporarily locked to the position-limit member B3 in the received (unlocking) position. When rotating the operating knob B4 relative to the position-limit member B3 and the mounting base member A to have the two cut planes B14 of the locking pin B1 face toward the two cut planes B31 of the position-limit member B3 and then release the force from operating knob B4, the compression spring B2 immediately pushes the locking pin B1 from the received (unlocking position) back to the extended (locking position) to suspend the bottom locking block B11 outside the axial through hole A0 of the mounting base member A.

According to the aforesaid prior art rotary fastener, the position-limit member B3 is fixedly mounted in the recessed accommodation chamber A1 of the mounting base member A, thus, the user cannot easily view the relative positions between the two cut planes B14 of the locking pin B1 and the two cut planes B31 of the position-limit member B3, making the operation difficult. Further, when pulling the operating knob B4 to lift the locking pin B1 relative to the position-limit member B3 and the mounting base member A, the compression spring B2 imparts a resistance to the operating knob B4, causing the user unable to keep the locking pin B1 in balance, and the locking pin B1 can be accidentally forced by the compression spring B2 toward the outside of the axial through hole A0 of the mounting base member A, causing the operating knob B4 to strike against the position-limit member B3 and the mounting base member A. Therefore, there is a strong demand for a rotary fastener that eliminates the drawbacks of the aforesaid prior art design.

SUMMARY OF THE INVENTION

The present invention has been accomplished under the circumstances in view. It is therefore the main object of the present invention to provide a rotary fastener for locking two panel members together, which has the advantages of ease of use, high installation reliability and high positioning accuracy.

To achieve this and other objects of the present invention, a rotary fastener in accordance with the present invention comprises a mounting base member that comprises a stepped accommodation chamber having an expanded lower part, a position-limit structure located at the periphery thereof and a bottom mounting neck, a fastening device that comprises a pin member suspending in the stepped accommodation chamber of the mounting base member and having an expanded bottom engagement portion and a head member fastened to the pin member and disposed outside the mounting base member, and an operating device that comprises a bottom seat member fastened to the mounting base member, an operating cap member fastened to the head member and rotatable relative to the bottom seat member to move the fastening device axially between a locking position where the expanded bottom engagement portion of the pin member is extended out of the bottom side of the mounting base member and an unlocking position where the expanded bottom engagement portion of the pin member is received in the stepped accommodation chamber of the mounting base member, and a guide track for guiding movement of the operating cap member relative to the bottom seat member.

Further, the guide track of said operating device comprises a plurality of high-position locating notches and low-position locating notches alternatively and equiangularly located on the bottom seat member (or operating cap member) at different elevations, a plurality of locating protrusions located on the operating cap member (or bottom seat member) for selectively engaging into said high-position locating notches or said low-position locating notches, a plurality of first sloping guide paths located on the bottom seat member (or operating cap member) and respectively extended from the high-position locating notches to the low-position locating notches, a plurality of L-shaped homing areas respectively extended from the high-position locating notches to the low-position locating notches in a reversed direction relative to the first sloping guide paths, a plurality of second sloping guide paths located on the operating cap member (or bottom seat member) and respectively fitting the first sloping guide paths, and a plurality of L-shaped retaining portions located on the operating cap member (or bottom seat member) and respectively fitting the L-shaped homing areas.

DETAILED DESCRIPTION OF THE PREFERRED EMBODIMENT

Figure 1:
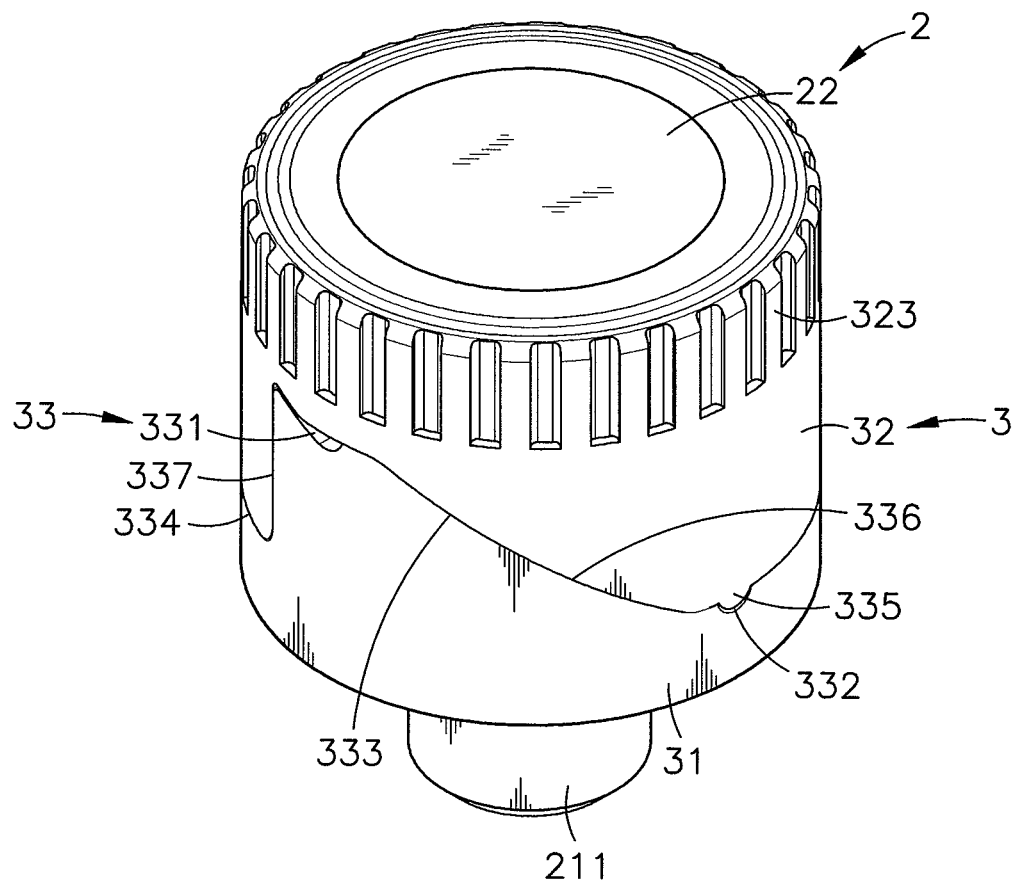
FIG. 1 is an oblique top elevational view of a rotary fastener in accordance with the present invention.
Figure 2:
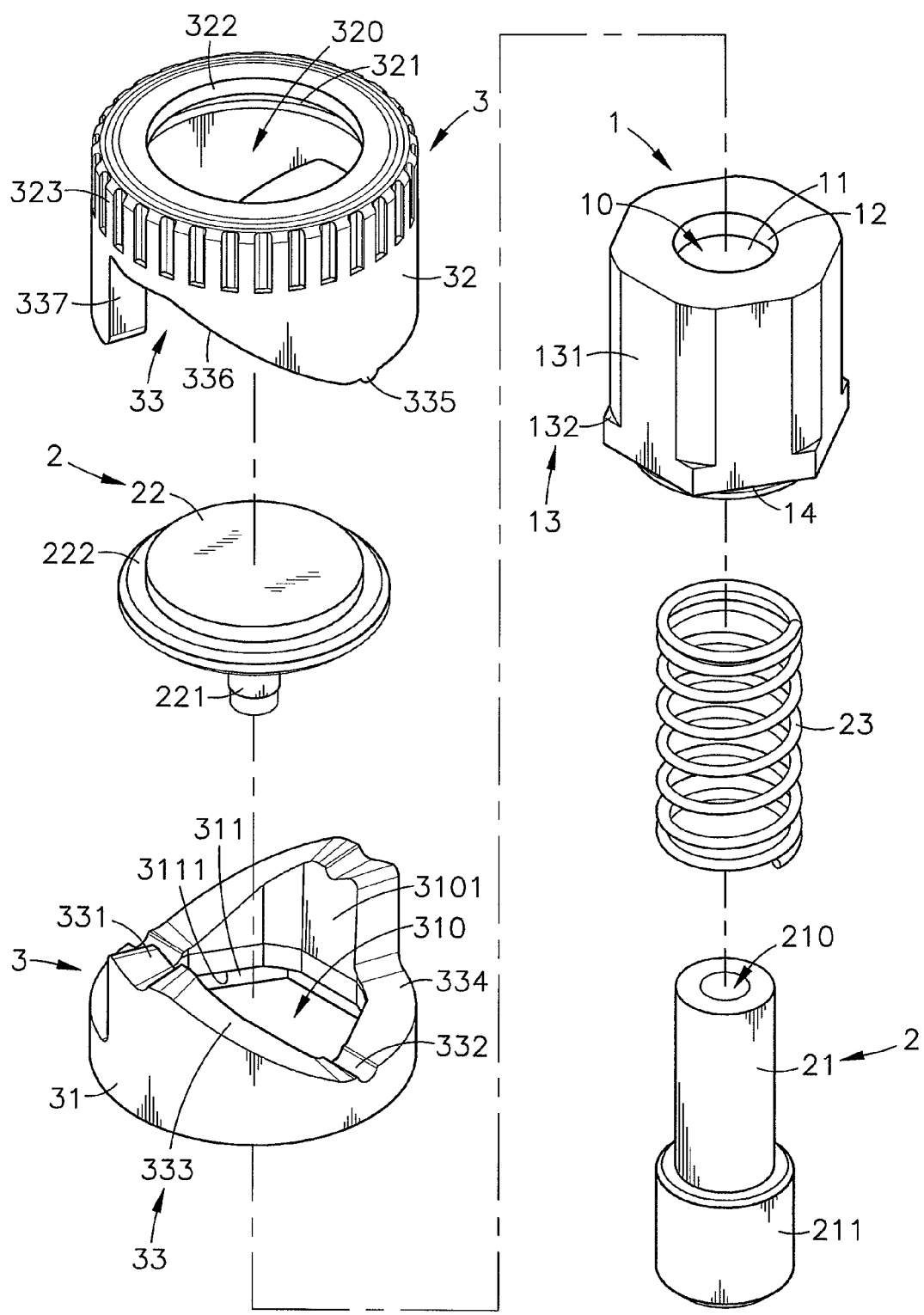
FIG. 2 is an exploded view of the rotary fastener in accordance with the present invention.
Figure 3:
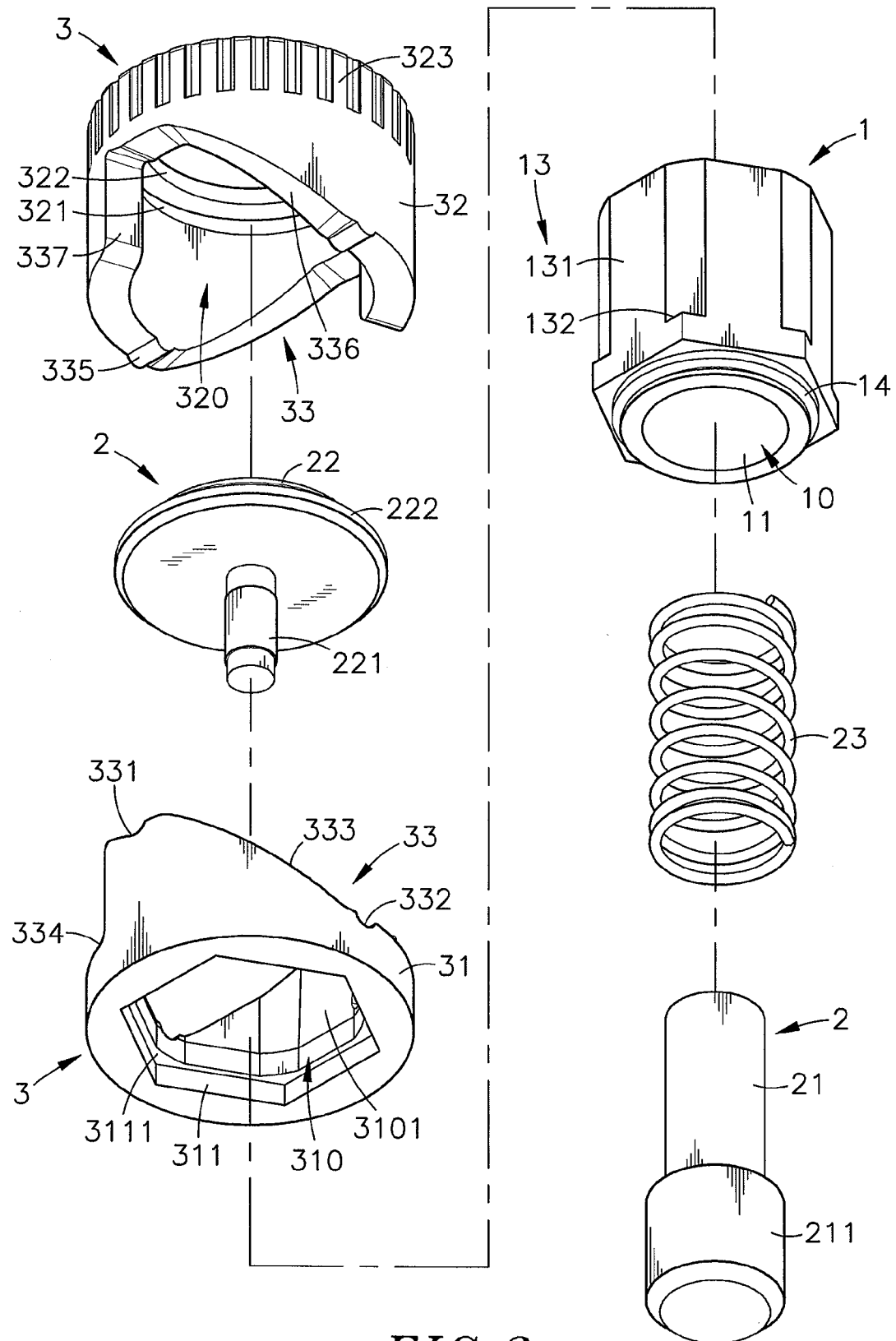
FIG. 3 corresponds to FIG. 2 when viewed from another angle.
Figure 4:
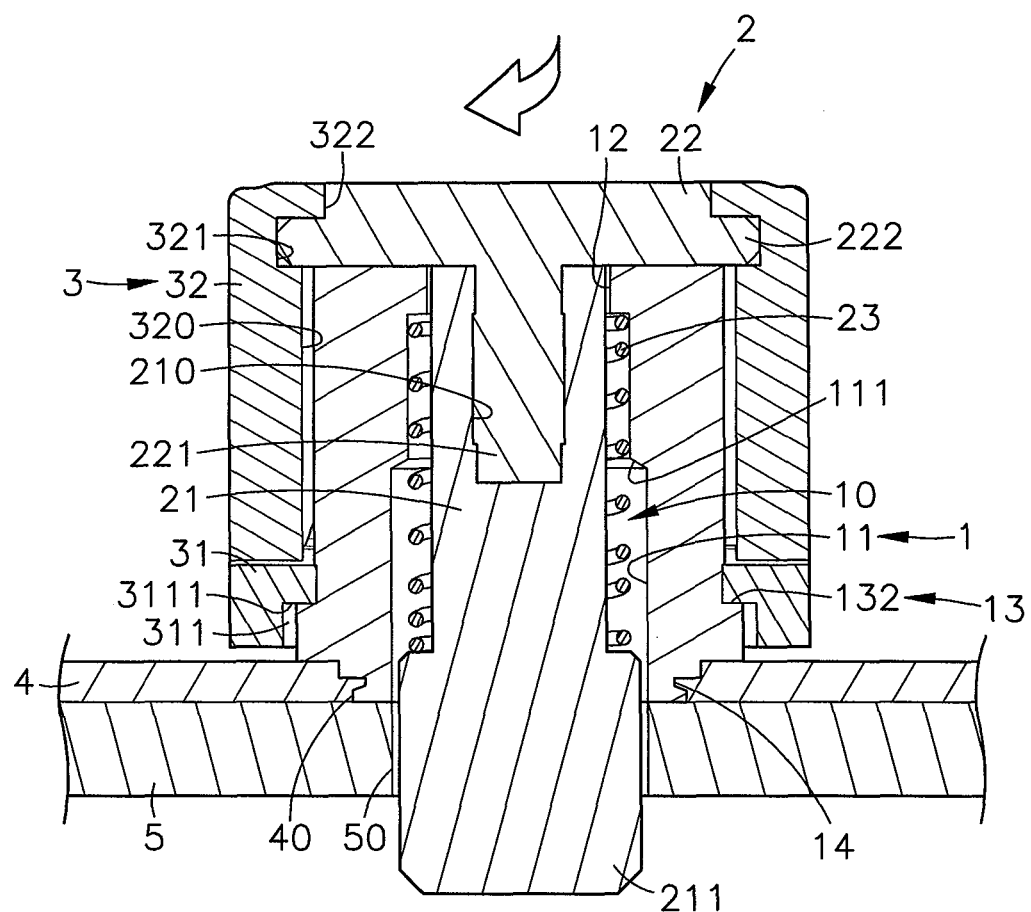
FIG. 4 is a schematic applied view of the present invention, illustrating the mounting base member affixed to a first panel member and the expanded bottom engagement portion of the pin member of the fastening device fastened to a second panel member.

Referring to FIGS. 1-4, a rotary fastener in accordance with the present invention is shown. The rotary fastener comprises a mounting base member 1, a fastening device 2, an elastic member, for example, compression spring 23, and an operating device 3.

The mounting base member 1 is a hollow cylindrical member comprising a stepped accommodation chamber 10 downwardly extending through a bottom side thereof and having an expanded lower part 11, an inside step 111 extending around an inside wall thereof at a top side of the expanded lower part 11 of the stepped accommodation chamber 10 (i.e., between the expanded lower part and the relatively smaller upper part of the stepped accommodation chamber 10), an axial hole 12 located at the center of a top side thereof in communication with the stepped accommodation chamber 10, a position-limit structure 13 located at the periphery thereof, and a bottom mounting neck 14 downwardly extended from the bottom side thereof around the expanded lower part 11. The position-limit structure 13 comprises a plurality of inverted-T cut planes 131 equiangularly spaced around the periphery of the mounting base member 1, and a shoulder 132 connected between each two adjacent inverted-T cut planes 131.

The fastening device 2 comprises a pin member 21 and a head member 22. The pin member 21 comprises an expanded bottom engagement portion 211 located at the center of a bottom end thereof, and a recessed mounting hole 210 located at an opposing top end thereof. The head member 22 comprises a mounting rod 221 vertically downwardly extended from the center of a bottom side thereof and press-fitted into the recessed mounting hole 210 of the pin member 21, and a locating flange 222 extending around the periphery thereof.

The compression spring 23 is sleeved onto the pin member 21 and supported on the expanded bottom engagement portion 211.

The operating device 3 comprises a bottom seat member 31, an operating cap member 32, and a guide track 33. The bottom seat member 31 comprises a position-limit space 310, a plurality of cut planes 3101 located on an inside wall thereof around the position-limit space 310, a bottom opening 311 defined in a bottom side thereof in communication with the position-limit space 310 and having a diameter relatively larger than the position-limit space 310, and a plurality of inside stop shoulders 3111 equiangularly spaced between the position-limit space 310 and the bottom opening 311. The operating cap member 32 comprises a bottom-open chamber 320, a locating groove 321 located on an inside wall thereof and extending around a top side of the bottom-open chamber 320 and adapted for receiving the locating flange 222 of the head member 22, a top opening 322 axially cut through a top wall thereof in communication with the locating groove 321 and the bottom-open chamber 320, and a grip 323 located on the periphery thereof. The grip 323 can be formed of a plurality of grooves and ribs alternatively arranged around the periphery of the operating cap member 32. The guide track 33 comprises two high-position locating notches 331 symmetrically located on a top side of the bottom seat member 31 at two opposing locations, two low-position locating notches 332 located on the top side of the bottom seat member 31 and bilaterally equally spaced between the high-position locating notches 331 at a relatively lower elevation, and two first sloping guide paths 333 and two L-shaped homing areas 334 symmetrically located on the top side of the bottom seat member 31 and respectively extended from the opposite high-position locating notches 331 to the low-position locating notches 332 in reversed directions, two locating protrusions 335 symmetrically located on an opposing bottom side of the operating cap member 32 at two opposing locations and selectively engageable into the high-position locating notches 331 or the low-position locating notches 332, two second sloping guide paths 336 located on the bottom side of the operating cap member 32 and respectively extended from the locating protrusions 335 and fitting the first sloping guide paths 333, and two L-shaped retaining portions 337 located on the bottom side of the operating cap member 32 and respectively extended from the locating protrusions 335 in a reversed manner relative to the second sloping guide paths 336 and respectively fitting the L-shaped homing areas 334. In the present preferred embodiment, the components 331-334 of the guide track 33 are located on the bottom seat member 31, and the other components 335-337 are located on the operating cap member 32. However, this design is not a limitation. Having the components 331-334 of the guide track 33 be located on the operating cap member 32 and the other components 335-337 on the bottom seat member 31 may achieve the same effects.

When assembling the rotary fastener, insert the pin member 21 with the compression spring 23 upwardly through the expanded lower part 11 of the stepped accommodation chamber 10 to have the compression spring 23 be stopped between the expanded bottom engagement portion 211 of the pin member 21 and a part of the mounting base member 1 below the axial hole 12, and then fasten the mounting rod 221 of the head member 22 to the recessed mounting hole 210 of the pin member 21 to have the head member 22 be suspended above the mounting base member 1, and then insert the mounting base member 1 into the position-limit space 310 of the bottom seat member 31 of the operating device 3 to keep the inverted-T cut planes 131 of the position-limit structure 13 in contact with the cut planes 3101 of the bottom seat member 31 and to have the shoulders 132 be received in the bottom opening 311 of the bottom seat member 31 and respectively stopped below the inside stop shoulders 3111 so that the bottom seat member 31 is prohibited from rotation relative to the mounting base member 1, and then cap the operating cap member 32 onto the head member 22 to force the top opening 322 and locating groove 321 of the operating cap member 32 into engagement with the periphery of the head member 22 and the locating flange 222. After the rotary fastener is assembled, the operating cap member 32 can be rotated relative to the bottom seat member 31 to move the fastening device 2 up and down between a locking position and an unlocking position.

Further, the mounting base member 1 can be made in a rectangular, pentagonal, hexagonal or other polygonal shape with multiple inverted-T cut planes 131 equiangularly spaced around the periphery thereof; the position-limit space 310 of the bottom seat member 31 is configured to subject to the rectangular, pentagonal, hexagonal or other polygonal configuration of the mounting base member 1; the cut planes 3101 in the position-limit space 310 of the bottom seat member 31 are adapted to fit the multiple inverted-T cut planes 131; the bottom opening 311 of the bottom seat member 31 is adapted for receiving the shoulders 132 of the position-limit structure 13, enabling the shoulders 132 to be respectively upwardly abutted against the inside stop shoulders 3111 of the bottom seat member 31 to prohibit relative axial displacement between the mounting base member 1 and the bottom seat member 31. Further, the mounting base member 1 is made of iron, copper, zinc or any of their alloys. Further, the bottom seat member 31 may be fixedly mounted on the mounting base member 1 by using insert molding technology.

Further, as described above, the pin member 21 of the fastening device 2 extends through the axial hole 12 of the mounting base member 1 to the outside of the stepped accommodation chamber 10 and the compression spring 23 is mounted around the pin member 21 and stopped between the expanded bottom engagement portion 211 of the pin member 21 and a part of the mounting base member 1 below the axial hole 12. Subject to the function of the guide track 33, the operating cap member 32 may be rotated relative to the bottom seat member 31 to move the fastening device 2 stably vertically in and out of the bottom side of the mounting base member 1 between a locking position and an unlocking position.

Figure 5:
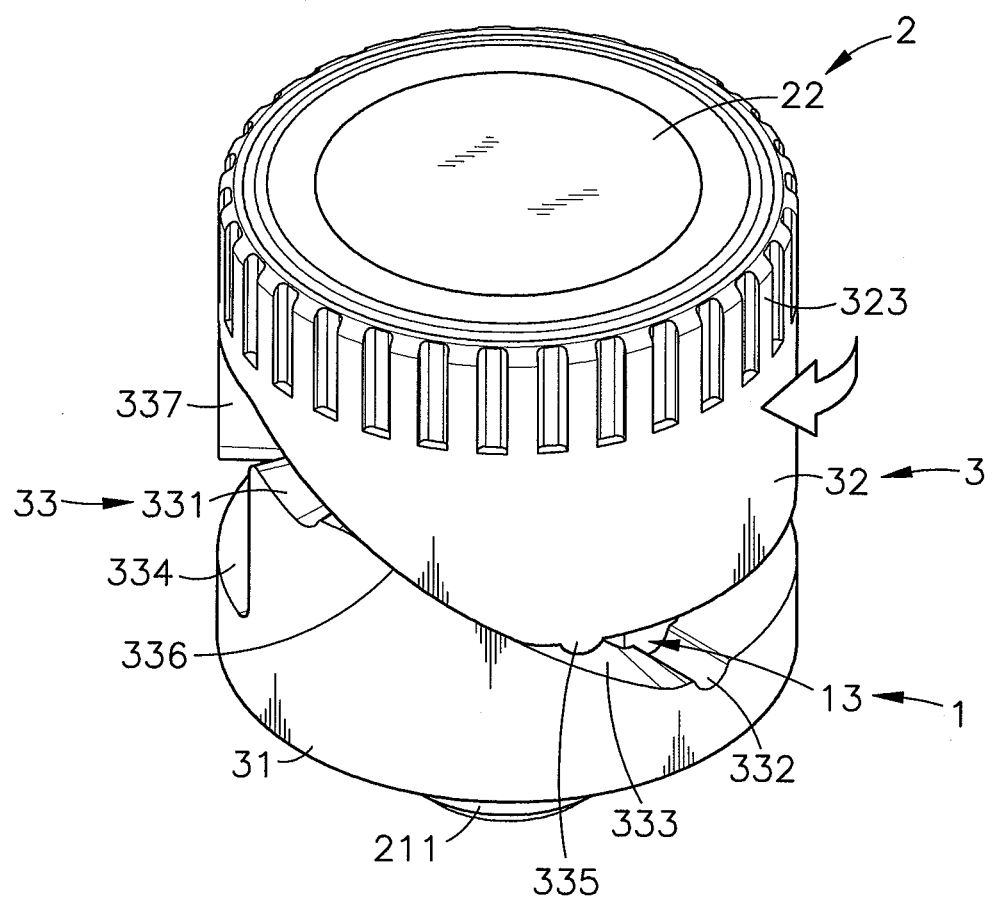
FIG. 5 is a schematic operational view of the present invention, illustrating the locating protrusions moved out of the respective low-position locating notches along the respective first sloping guide paths toward the respective high-position locating notches.
Figure 6:
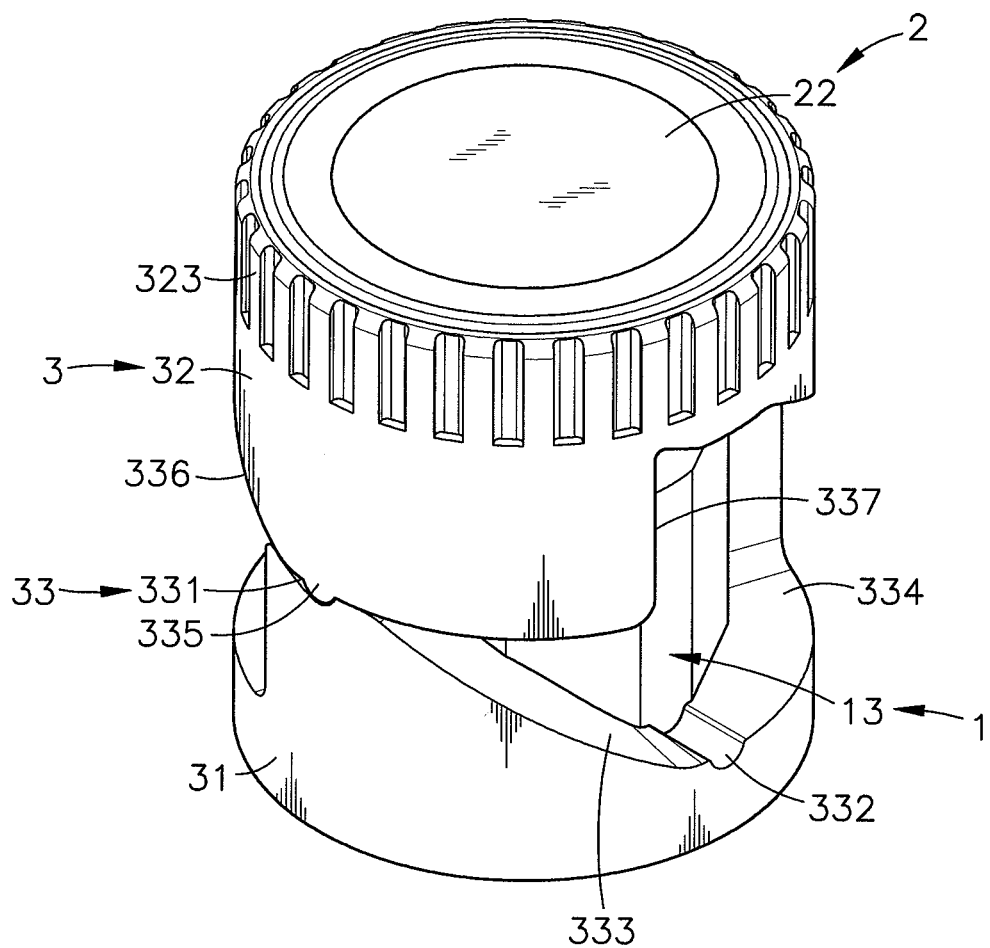
FIG. 6 corresponds to FIG. 5, illustrating the locating protrusions respectively engaged into the respective high-position locating notches.
Figure 7:
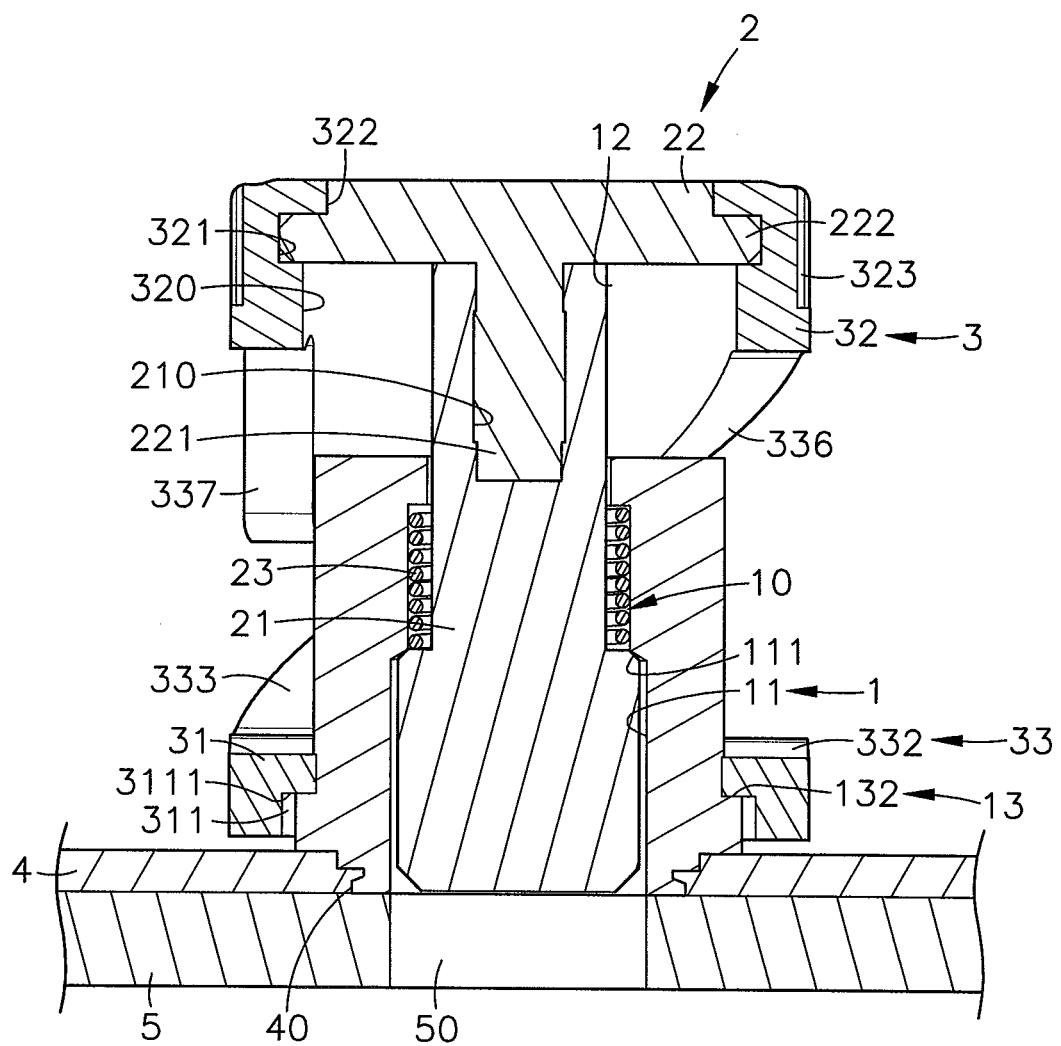
FIG. 7 is a sectional view of the present invention, illustrating the pin member of the fastening device received in the mounting base member in the unlocking position.

Referring to FIGS. 5-7 and FIGS. 2 and 4 again, in the application of the present invention, the bottom mounting neck 14 of the mounting base member 1 is affixed to a mounting hole 40 of a first panel member 4, enabling the fastening device 2, the compression spring 23 and the operating device 3 to be operably attached to the first panel member 4. At this time, the user can attach the first panel member 4 to a second panel member 5, and then operate the operating cap member 32 of the operating device 3 to move the fastening device 2 from the unlocking position to the locking position where the expanded bottom engagement portion 211 of the pin member 21 is engaged into a locking hole 50 of a second panel member 5 to lock the first panel member 4 and the second panel member 5 together. When moving the fastening device 2 from the locking position to the unlocking position, hold the grip 323 of the operating cap member 32 of the operating device 3 and then rotate the operating cap member 32 in one direction relative to the bottom seat member 31 to move the bottom protrusions 335 of the guide track 33 out of the respective low-position locating notches 332 along the first sloping guide paths 333 to the respective high-position locating notches 331. At this time, the expanded bottom engagement portion 211 of the pin member 21 is disengaged from the locking hole 50 of the second panel member 5 and received inside the stepped accommodation chamber 10 of the mounting base member 1. During rotation of the fastening device 2 with the operating cap member 32, the inverted-T cut planes 131 of the position-limit structure 13 are respectively abutted against the cut planes 3101 of the bottom seat member 31, preventing displacement of the bottom seat member 31 relative to the first panel member 4.

When moving the fastening device 2 from the unlocking position to the locking position, hold the grip 323 of the operating cap member 32 of the operating device 3 and then rotate the operating cap member 32 forwardly in the same direction relative to the bottom seat member 31 to move the bottom protrusions 335 of the guide track 33 out of the respective high-position locating notches 331 into the homing areas 334 and then the respective low-position locating notches 332, enabling the respective L-shaped retaining portions 337 to be respectively engaged into the respective homing areas 334 and the respective second sloping guide paths 336 to be abutted against the respective first sloping guide paths 333. At this time, the expanded bottom engagement portion 211 of the pin member 21 is extended out of the stepped accommodation chamber 10 of the mounting base member 1 and engaged into the locking hole 50 of the second panel member 5 to lock the first panel member 4 and the second panel member 5 together. In this embodiment, the high-position locating notches 331 and the low-position locating notches 332 are alternatively arranged on the top side of the bottom seat member 31 and spaced from one another at a 90 degree angle, enabling the locating protrusions 335 to be accurately moved with the operating cap member 32 into engagement with the low-position locating notches 332 or the high-position locating notches 331 between the locking position and the unlocking position.

Figure 8:
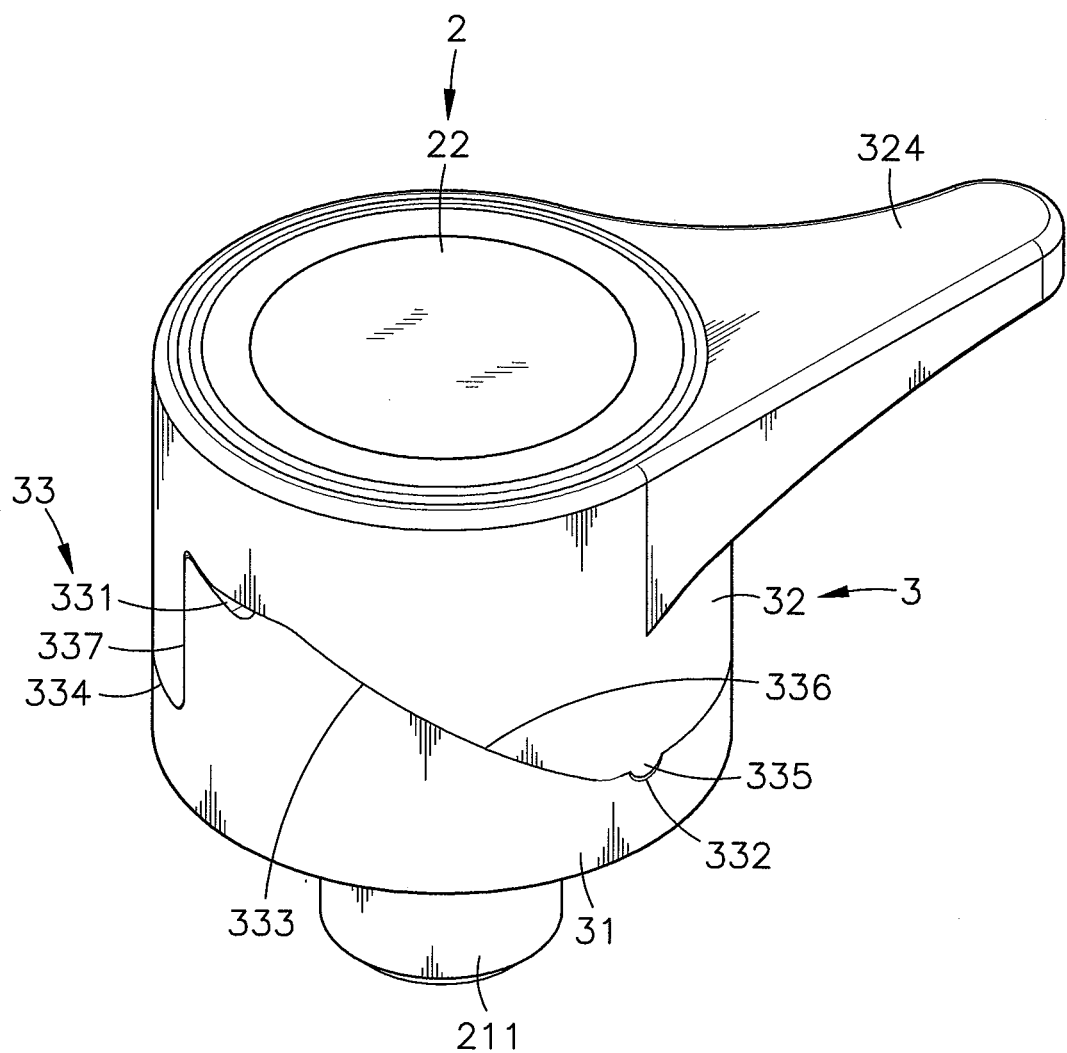
FIG. 8 is an oblique top elevational view of an alternate form of the rotary fastener in accordance with the present invention.
Figure 9:
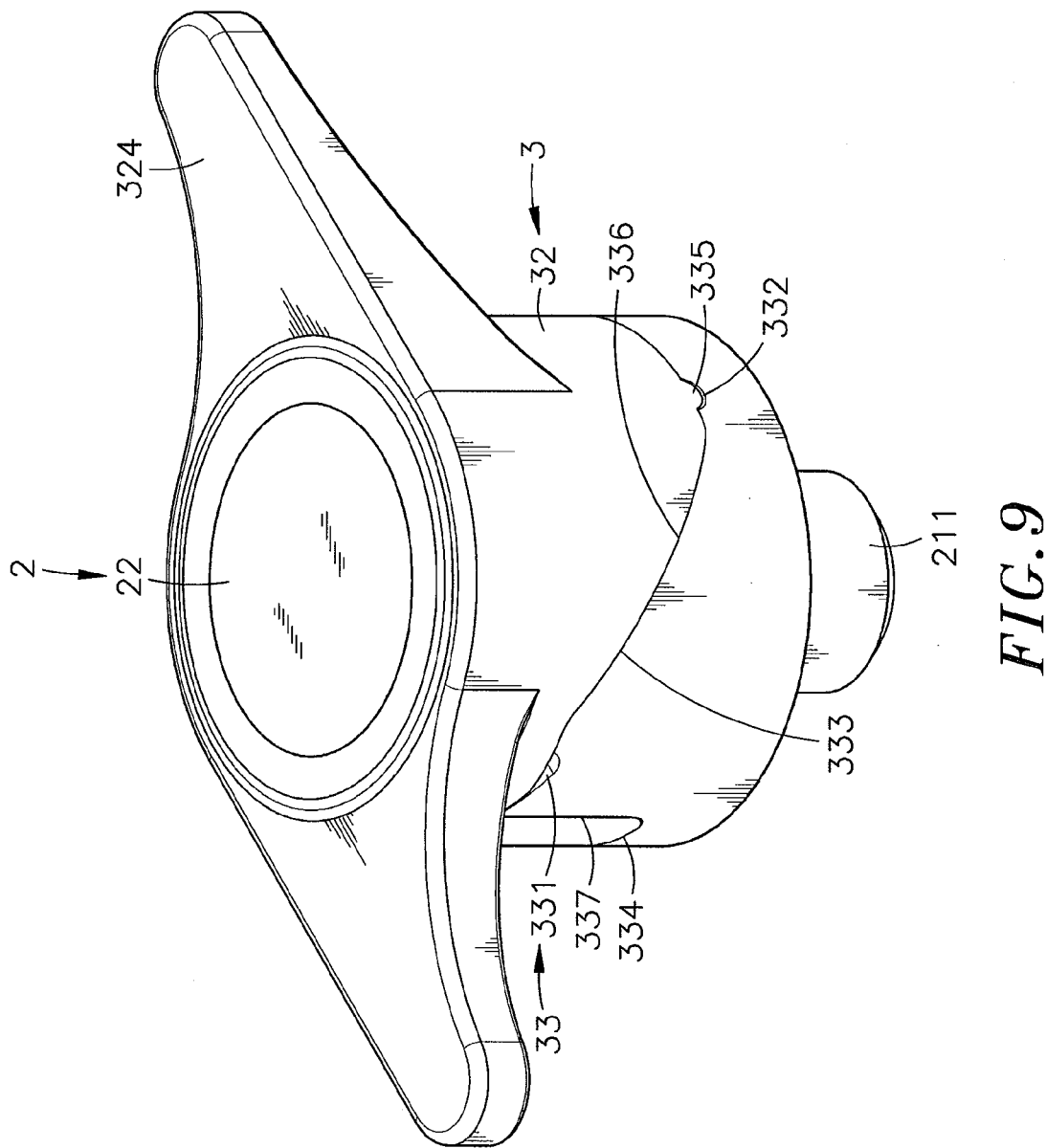
FIG. 9 is an oblique top elevational view of another alternate form of the rotary fastener in accordance with the present invention.
Figure 10:
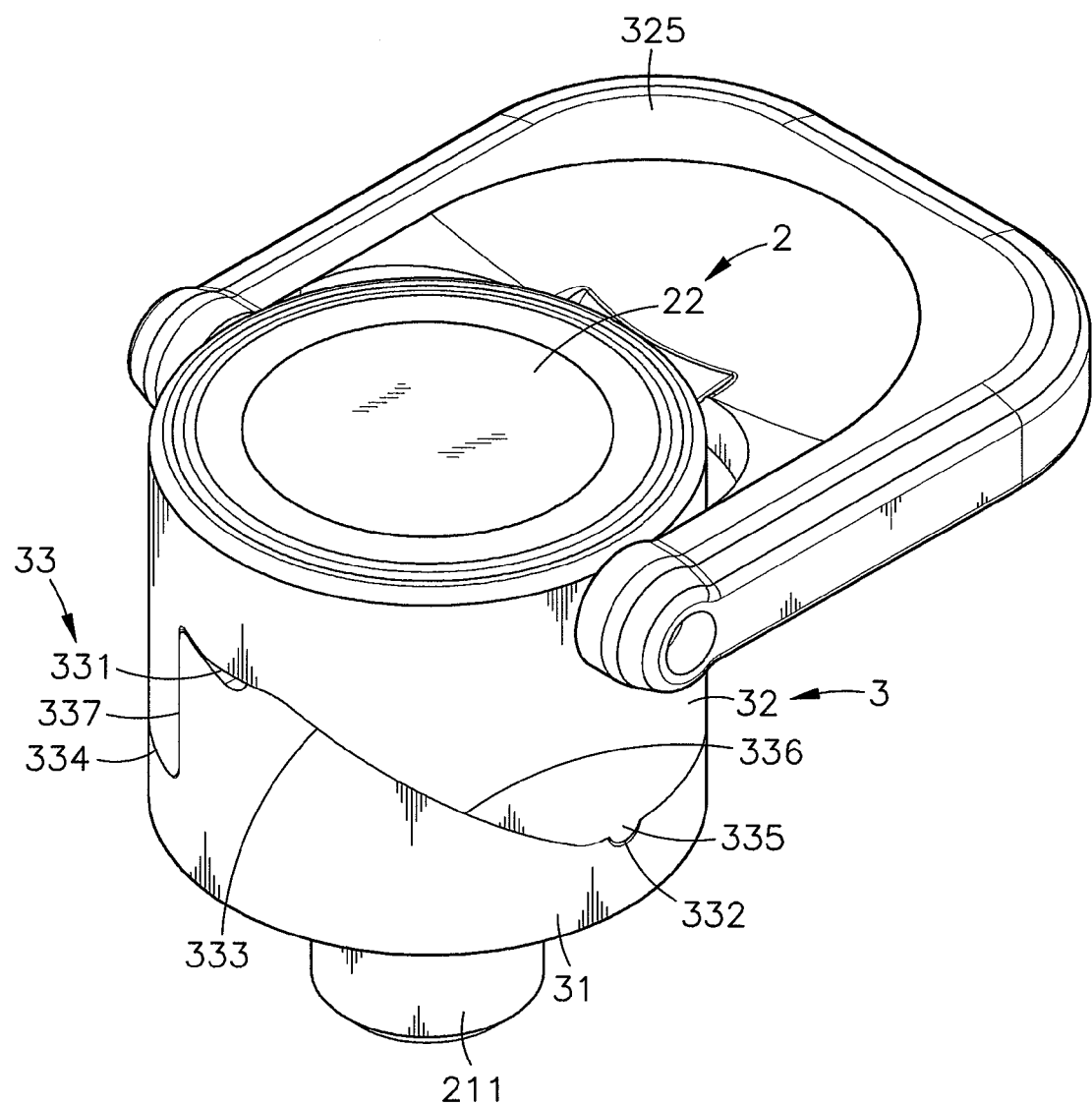
FIG. 10 is an oblique top elevational view of still another alternate form of the rotary fastener in accordance with the present invention.
Figure 11:
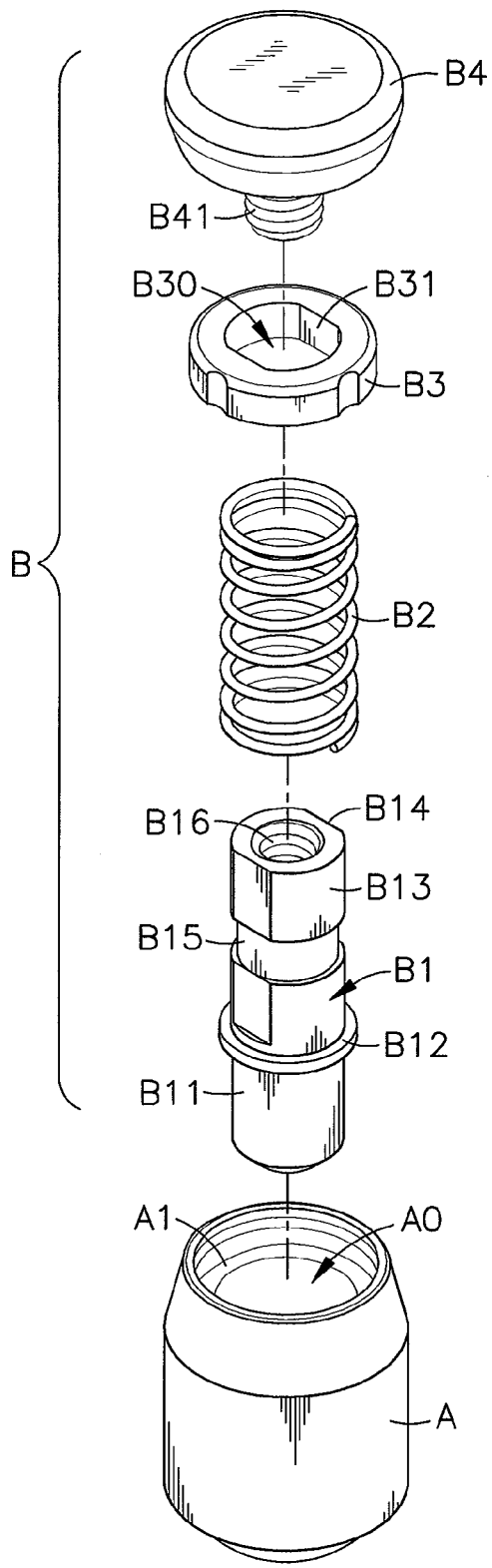
FIG. 11 is an exploded view of a rotary fastener according to the prior art.
Figure 12:
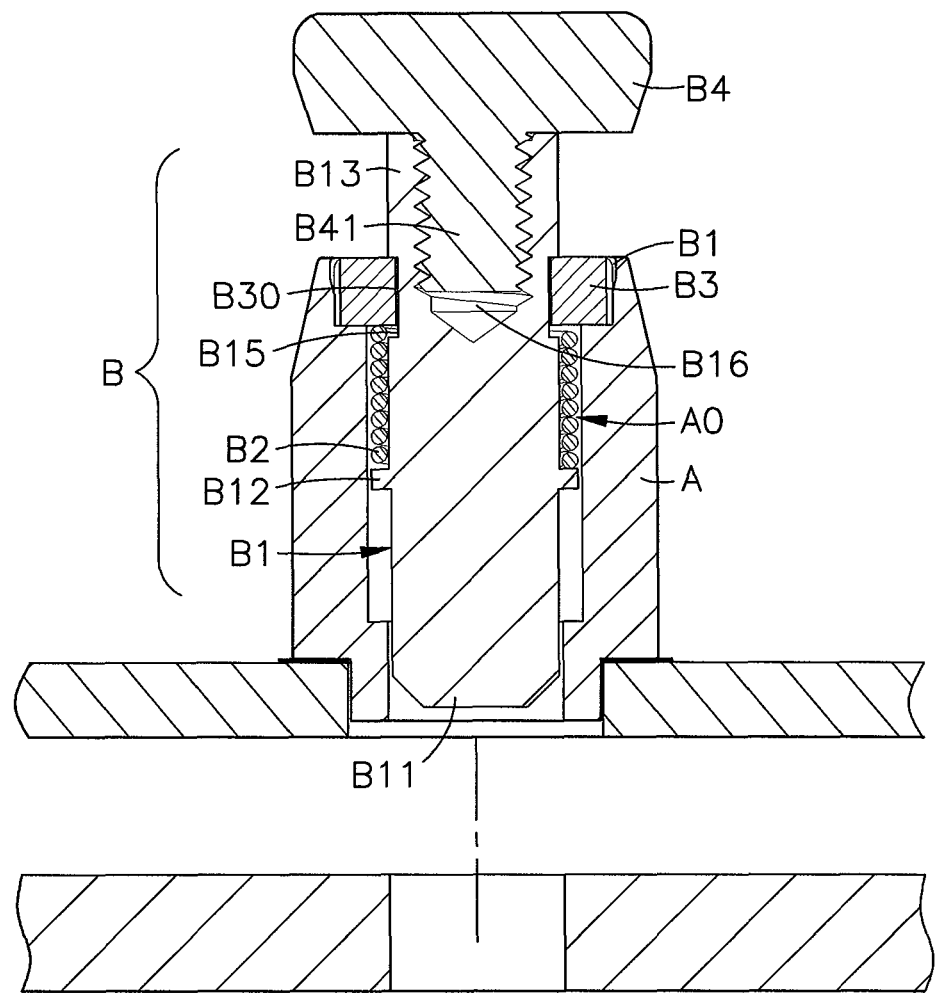
FIG. 12 is a schematic sectional applied view of the prior art rotary fastener.

Referring to FIGS. 8-10 and FIGS. 1 and 2 again, handle means may be provided at the operating cap member 32 to substitute for the grip 323. In the embodiment shown in FIG. 8, the operating cap member 32 comprises a handle 324 that extends perpendicularly from the periphery of the operating cap member 32 at a top side. In the embodiment shown in FIG. 9, the operating cap member 32 comprises two handles 324 that extend perpendicularly from the periphery of the operating cap member 32 at two opposite lateral sides. In the embodiment shown in FIG. 10, the operating cap member 32 comprises a U-shaped handle 325 that has two distal ends thereof respectively pivotally connected to the periphery of the operating cap member 32 at two opposite sides.

Through the handle(s) 324 or U-shaped handle 325, the user can rotate the operating cap member 32 relative to the bottom seat member 31 to move the pin member 21 of the fastening device 2 in and out of the mounting base member 1 between the locking position and the unlocking position conveniently with less effort. Further, in these alternate forms of the present invention, the aforesaid elastic member (compression spring) 23 can be eliminated.

In conclusion, the invention provides a rotary fastener mountable at a first panel member 4 for detachably locking the first panel member 4 to a second panel member 5 through a rotary operation. The rotary fastener comprises a mounting base member 1 that comprises a stepped accommodation chamber 10 having an expanded lower part 11, a position-limit structure 13 located at the periphery thereof and a bottom mounting neck 14, a fastening device 2 that comprises a pin member 21 suspending in the stepped accommodation chamber 10 of the mounting base member 1 and having an expanded bottom engagement portion 211 and a head member 22 fastened to the pin member 21 and disposed outside the mounting base member 1, and an operating device 3 that comprises a bottom seat member 31 fastened to the mounting base member 1, an operating cap member 32 fastened to the head member 22 and rotatable relative to the bottom seat member 31 to move the fastening device 2 between a locking position where the expanded bottom engagement portion 211 of the pin member 21 is extended out of the bottom side of the mounting base member 1 and an unlocking position where the expanded bottom engagement portion 211 of the pin member 21 is received in the stepped accommodation chamber 10 of the mounting base member 1, and a guide track 33 for guiding movement of the operating cap member 32 relative to the bottom seat member 31.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A rotary fastener installed in a mounting through hole of a first panel member and adapted for detachably locking said first panel member to a locking hole of a second panel member, the rotary fastener comprising:
 a mounting base member comprising a stepped accommodation chamber defined therein, a position-limit structure located at the periphery thereof and a bottom mounting neck located at a bottom side thereof and affixed to said mounting through hole of said first panel member;
 a fastening device adapted for fastening to said locking hole of said second panel member to lock said first panel member to said second panel member, said fastening device comprising a pin member having a bottom end thereof inserted into said stepped accommodation chamber of said mounting base member and terminating in an expanded bottom engagement portion and an opposing top end thereof extended out of a top side of said mounting base member a head member fastened to the top end of said pin member and disposed outside said mounting base member;
 an elastic member mounted around said pin member and stopped between said expanded bottom engagement portion and a part of said mounting base member; and
 an operating device operable to move said fastening device between a locking position where said expanded bottom engagement portion is moved out of said stepped accommodation chamber of said mounting base member and engaged into said locking hole of said second panel member and an unlocking position where said stepped accommodation chamber is received in said stepped accommodation chamber of said mounting base member and disengaged from said locking hole of said second panel member, said operating device comprising a bottom seat member attached to said position-limit structure around said mounting base member, said bottom seat member comprising a position-limit space adapted for accommodating said position-limit structure to prohibit said bottom seat member from movement relative to said mounting base member, an operating cap member fastened to said head member of said fastening device and rotatable relative to said bottom seat member and said mounting base member to move said fastening device between said locking position and said unlocking position, said operating cap member comprising a bottom-open chamber adapted for accommodating said head member, and a guide track disposed between said bottom seat member and said operating cap member to guide said operating cap member and said fastening device to move axially relative to said bottom seat member and said mounting base member during a rotary motion of said operating cap member by an external force.

2. The rotary fastener as claimed in claim 1, wherein said position-limit structure of said mounting base member comprises a plurality of inverted-T cut planes equiangularly spaced around the periphery of said mounting base member, enabling said mounting base member to provide one of rectangular, pentagonal, hexagonal or other polygonal configurations.

3. The rotary fastener as claimed in claim 1, wherein said stepped accommodation chamber of said mounting base member has an expanded lower part for receiving said expanded bottom engagement portion of said pin member; said mounting base member further comprises an inside step extending around an inside wall thereof at a top side of said expanded lower part of said stepped accommodation chamber and adapted for stopping at said elastic member against said expanded bottom engagement portion of said pin member.

4. The rotary fastener as claimed in claim 1, wherein said pin member comprises a recessed mounting hole axially located in the top end thereof; said head member comprises a mounting rod downwardly extended from a bottom side thereof and fastened to said recessed mounting hole of said pin member, and a locating flange extending around the periphery thereof; said operating cap member comprises a locating groove extending around an inside wall thereof and fastened to said locating flange of said head member.

5. The rotary fastener as claimed in claim 1, wherein said guide track of said operating device comprises a plurality of high-position locating notches and low-position locating notches alternatively and equiangularly located on one of said bottom seat member and said operating cap member at different elevations, and a plurality of locating protrusions located on the other of said bottom seat member and said operating cap member for selectively engaging into said high-position locating notches or said low-position locating notches.

6. The rotary fastener as claimed in claim 5, wherein said high-position locating notches and low-position locating notches alternatively located on one of said bottom seat member and said operating cap member at different elevations and spaced from one another at a 90 degree angle.

7. The rotary fastener as claimed in claim 6, wherein said guide track of said operating device further comprises a plurality of first sloping guide paths located on one of said bottom seat member and said operating cap member and respectively extended from said high-position locating notches to said low-position locating notches, a plurality of L-shaped homing areas respectively extended from said high-position locating notches to said low-position locating notches in a reversed direction relative to said first sloping guide paths, a plurality of second sloping guide paths located on the other of said bottom seat member and said operating cap member and respectively fitting said first sloping guide paths, and a plurality of L-shaped retaining portions located on the other of said bottom seat member and said operating cap member and respectively fitting said L-shaped homing areas.

8. The rotary fastener as claimed in claim 6, wherein said operating cap member further comprises a grip formed integral with the periphery thereof, said grip comprising a plurality of grooves and ribs alternatively spaced around the periphery of said operating cap member.

9. The rotary fastener as claimed in claim 8, wherein said operating cap member further comprises at least one handle located at the periphery thereof.

10. The rotary fastener as claimed in claim 1, wherein said mounting base member is a metal member selected from the material group of iron, copper, zinc and their alloys; said bottom seat member is a plastic member molded on said mounting base member by using insert molding technology.

* * * * *